July 13, 1971   L. BRAUN   3,592,697
RESERVE BATTERY SYSTEM

Filed Feb. 28, 1969   2 Sheets-Sheet 1

INVENTOR.
LEON BRAUN
BY
LERNER & BEHR
ATTORNEYS

July 13, 1971     L. BRAUN     3,592,697

RESERVE BATTERY SYSTEM

Filed Feb. 28, 1969     2 Sheets-Sheet 2

INVENTOR.
LEON BRAUN

BY

LERNER & BEHR
ATTORNEYS

United States Patent Office 3,592,697
Patented July 13, 1971

3,592,697
RESERVE BATTERY SYSTEM
Leon Braun, Linden, N.J., assignor to
Molecular Energy Corporation
Filed Feb. 28, 1969, Ser. No. 803,180
Int Cl. H01m 7/00
U.S. Cl. 136—162
10 Claims

ABSTRACT OF THE DISCLOSURE

There is provided a novel system of producing electrical energy at high power levels for long time periods. The novel system possessses an indefinite shelf life and may be activated within time periods of the order of seconds. The system comprises a voltage sensing control device, set to activate an electrolyte discharging means which causes electrolyte to flow into an inert battery system activating the same and providing the desired reserve electrical energy. Further means are provided for utilizing the power available in a cell after it has ostensibly fallen below, a predetermined useful level.

FIELD OF THE INVENTION

Reserve battery power systems.

DESCRIPTION OF THE PRIOR ART

The need for providing reserve power for electrical systems and facilities which cannot be allowed to be deprived of power is one of long standing. Heretofore, the problem has been solved by one of two general means. In the first means, the reserve power has been provided by banks of so-called dry cells. These cells of course are not truly dry but are so designated since they utilize a paste electrolyte in contrast to an aqueous electrolyte. It is well known that such batteries have a comparatively brief shelf life and may themselves be found inoperative at the crucial time. Therefore, in order to maintain the reserve power system in guaranteed working order such batteries must be frequently changed even if they have not been used, leading to considerable expense.

Alternatively the reserve power may be provided by wet cells, however it is also well known that unless such cells are maintained at a constant trickle charge they will very rapidly lose their charge and be inoperative in an emergency situation.

It is therefore desirable to develop a system which will be virtually instantaneously operative, that is to say, will deliver full power a few seconds after activation and moreover, which operate on a fail safe basis. That is to say, in the event that the first power unit in the reserve power bank should itself fail or be inoperative, the system will automatically proceed one by one through secondary and tertiary reserve banks to rapidly provide the desired reserve power. Furthermore, such a system should be so set up that upon exhaustion or near exhaustion of a first bank of emergency power units, the subsequent bank could be put into operation without the danger of power loss to the previously exhausted units. Further, the power left in a supposedly previously exhausted unit can be used to lengthen the life of the newly added unit.

SUMMARY OF THE INVENTION

The system of the present invention comprises one or more reserve batteries connected in series and banks of such batteries connected in parallel. These batteries however, are of that class of batteries which will deliver power within a very short time interval after addition thereto of an electrolyte medium. In the system as installed however, the batteries or banks of batteries do not initially contain any electrolyte and thus have an indefinite shelf life prior to activation. The battery banks are electrically connected to the circuit to which they are intended to deliver power upon failure of the conventional power source to that system. A voltage sensing and control means is connected across the load circuit and is also connected to a controller means for dispensing electrolyte into the cells of the batteries. The system further comprises a source of electrolyte from which the electrolyte may be dispensed into the battery.

When the voltage in the system to be protected drops below a predetermined value, the voltage control activates the controller means which in turn causes dispensing of the electrolyte into the cells of the battery which in turn gives rise to a very rapid supply of current to the circuit to be protected from power failure.

In a further modification of the system diodes are placed between each bank of batteries and the circuit to be protected, to prevent back flow of current and also to prevent the recharge of exhausted batteries by banks of batteries in parallel therewith.

There are certain circumstances under which it is desirable to deliver a relatively low but constant flow of power for long periods of time, where recharge of batteries by conventional means is not convenient. An example of such a circumstance would be the electrical supply system of a navigational buoy or other load which must be supplied power for long periods of time without service. In such buoys loads it is conventional to use primary batteries which are known to have a fairly substantial life under load. In the modification of the present invention, reserve batteries are placed in parallel with a rechargeable battery, thus, when the voltage in the load circuit drops below a predetermined amount, the voltage controller causes the control device to activate one bank of reserve batteries. Upon activation, the reserve battery substantially discharges itself by recharging the principal rechargeable battery which will then again be enabled to operate for a substantial period of time, while at the same time supplying the load with power to operate during the recharging.

It is an object of the present invention to provide a system for delivery of reserve electrical power with a high degree of reliability while being substantially free of maintenance and free from shelf deterioration.

It is a further object of the system of the present invention to provide a means for in situ recharge of low voltage rechargeable batteries delivering low current at low voltage for substantial lengths of time.

It is yet another object of the present invention to provide a system of reserve electrical power equipped with a fail safe mechanism insuring that in the event of the failure of a primary bank of reserve batteries a secondary, tertiary, quaternary etc. bank of reserve batteries would be rapidly brought into operation.

DESCRIPTION OF THE DRAWINGS

The drawings illustrate a system comprising four banks of batteries each containing three cells connected in series. It is to be understood that these numbers of cells and numbers of banks have been chosen for illustration only. The system as illustrated is equally applicable for a greater or lesser number of cells per bank and a greater or lesser number of banks per unit.

DESCRIPTION OF THE PREFERRED EMBODIMENTS

Figure 1:
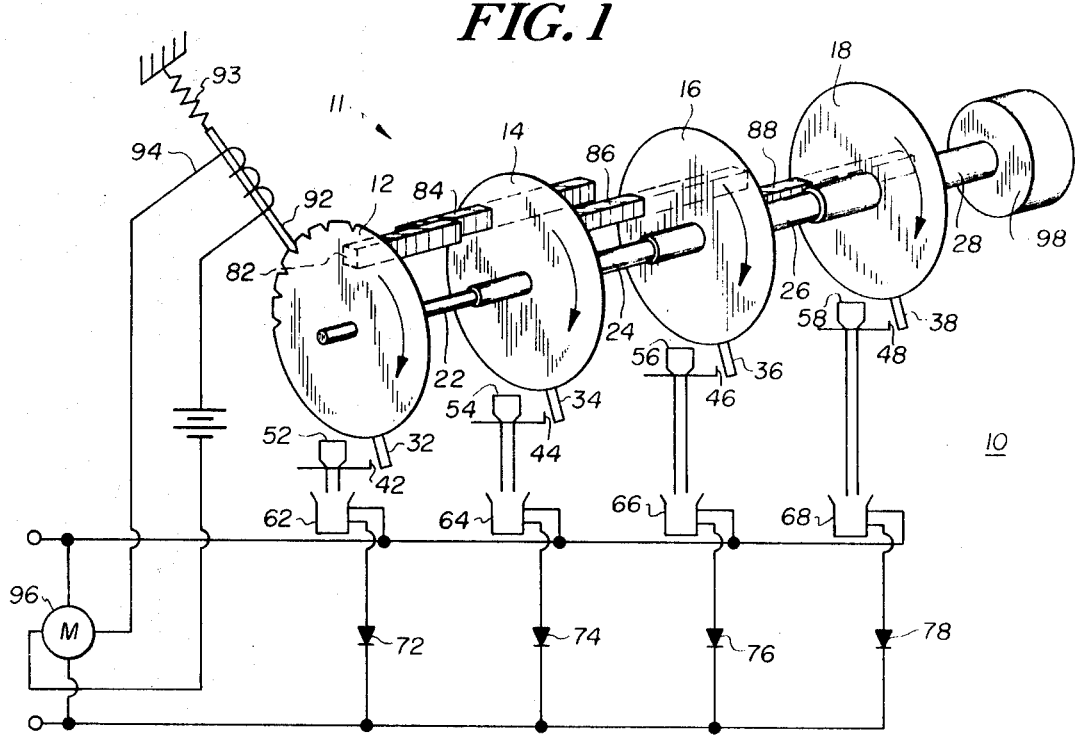
FIG. 1 is an exploded perspective view of a specific embodiment of the invention illustrating a diagrammatic circuit and one specific controller means for electrolyte dispensing.

In FIG. 1 there is shown a reserve battery system incorporating the features of the present invention generally designated by the numeral 10. The system 10 includes four reserve batteries 62, 64, 66, and 68 each connected in series with a diode 72, 74, 76 and 78 respectively The nonactivated high energy cells 62, 64, 66 and 68 are connected in parallel across a load circuit to be protected. Examples of such high energy reserve batteries are silver chloride-magnesium cell which utilize aqueous sodium chloride as an electrolyte, silver oxide-zinc batteries which utilize aqueous potassium hydroxide an an electroylte, copper chloride/magnesium cells which utilize salt water as an electrolyte, zinc/air cells which utilize aqueous potassium hydroxide as an electrolyte, lead oxide/lead cells which utilize dilute aqueous sulfuric acid as electrolytes and, most desirably, cells having magnesium or zinc cathodes and a copper fluoride complex as an anode which utilize water as the electrolyte (the last and preferred cells disclosed in U.S. Patent application Assigned to Molecular Energy Corporation, Ser. No. 610,802 filed Jan. 23, 1967 by John J. Root, now Pat. No. 3,450,570.

In the system 10 a controller element 11 is provided which comprises a series of discs 12, 14, 16, and 18 mounted upon coaxial shafts 22, 24, 26, and 28.

Figure 2:
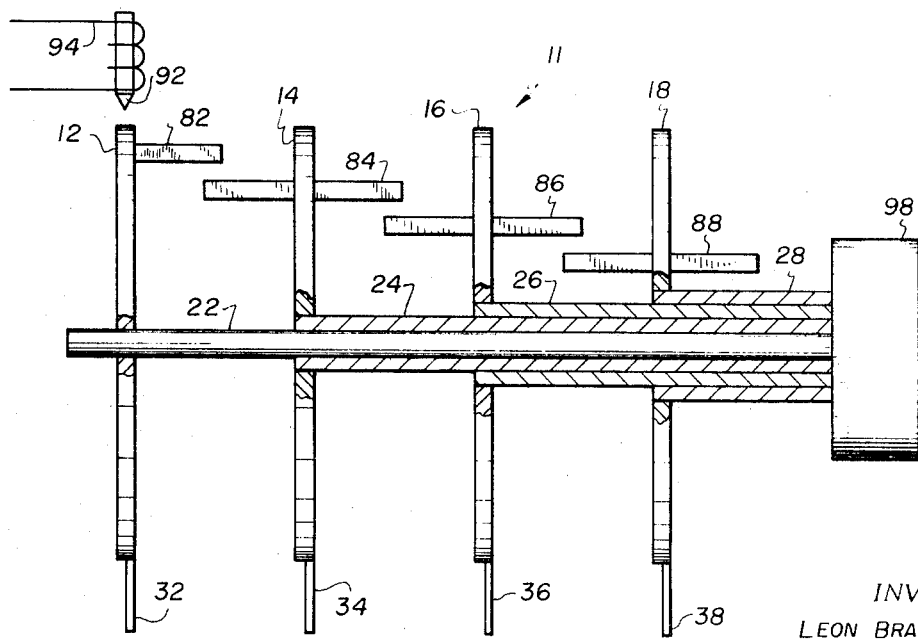
FIG. 2 is a side elevational view of the controller segment of the modification of FIG. 1.

The circumference of disc 12 is cut in the form of a gear wheel. This aspect of the modification is merely for convenience and is not critical as will appear hereinbelow. Cross pieces 82, 84, 86, and 88 are mounted on discs 12, 14, 16, and 18 respectively and placed at substantially the same distance from the axis of each disc perpendicular to the plane thereof. However, as shown in FIG. 2, the individual discs are so disposed upon their axes that disc 12 must rotate almost 360 degrees before cross piece 82 will engage with cross piece 84, similarly with respect to the mutual engagement of cross pieces 84 with 86, and 86 with 88. Attached to the drive shaft 22 is a conventional, preferably nonelectrically activated drive means 98, preferably a spring driven drive means with an escapement such as a clock motor. The rate of rotation of the drive means 98 being slightly greater than the time normally expected for the cells of the reserve bank to reach their full power upon addition to said cell of an appropriate electrolyte. There is set upon the circumference of each of discs 12, 14, 16 and 18 a radially protruding projection 32, 34, 36, and 38 respectively.

Adjacent to the cells of each of banks 62, 64, 66 and 68 are electrolyte bearing containers 52, 54, 56, and 58 respectively each being equipped with electrolyte release or dispensing means 42, 44, 46, and 48 respectively.

A voltage sensing means 96 is connected to a braking means to prevent the rotation of disc 12. Suitably such a braking means may be a relay 94 having attached thereto a dog 92 engaging in the teeth of the gear cut in disc 12. Said dog 92 having attached thereto a spring 93, said spring 93 biasing dog 92 out engagement with the teeth of the gear in disc 12. Thus acting as a fail safe means. While the use of such a dog and gear braking means is convenient, the scope of the invention is not to be considered as limited thereto.

Upon failure of the primary power source for the load circuit, the voltage sensing means 96 will deactivate the braking means 92, 94 by causing the dog 92 to disengage from the teeth in disc 12. Disc 12 will then rotate in a clockwise direction under the rotary power provided through shaft 22 by rotary drive means 98. Protrusion 32 will then interact with injection release means 42 causing electrolyte in reservoir 52 to be dispensed into battery bank 62 activating said battery bank.

As mentioned heretofore the rate of rotation of shaft 22 is set so that when the full power of bank 62 is reached, voltage controller 96 will cause dog 92 to engage with the teeth of disc 12 before disc 12 has rotated to the point at which cross piece 82 will engage with cross piece 84.

In the event however, that cell 62 is faulty or discharged and does not deliver the full power disc 12 will continue to rotate and by engaging cross piece 82 with cross piece 84 will cause disc 14 to rotate thus similarly activating cell 64. Similarly in sequence the engagement of cross piece 84 with cross piece 86 will cause the activation of cell 66 and the engagement of cross piece 86 with cross piece 88 will cause the activation of cell 68.

Figure 4:
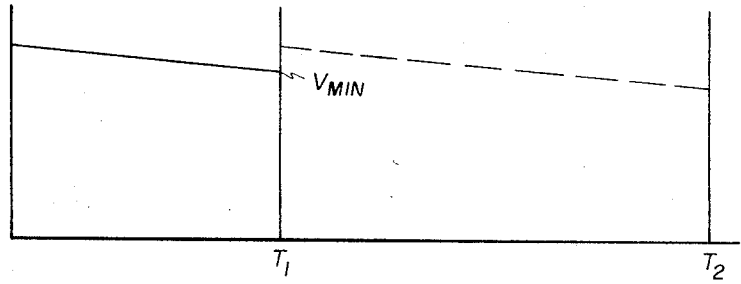
FIG. 4 is a plot of voltage against time showing the effect of activating a second reserve bank after the voltage of the first reserve bank has dropped below the desired amount in FIG. 1.
Figure 5:
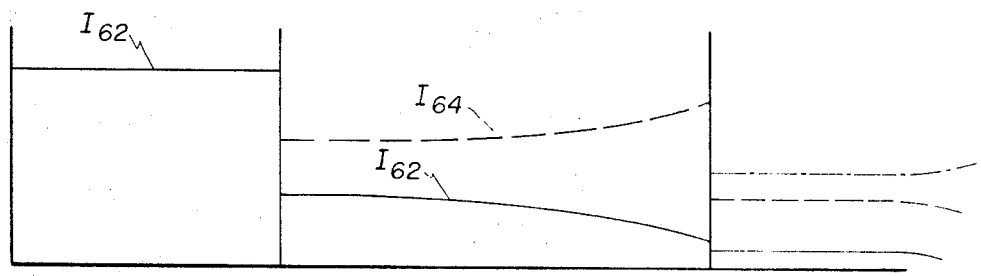
FIG. 5 is a current, time graph for the circuit of FIG. 1.

The sequence of operations is as follows: Battery unit 62 is activated first. Then battery unit 62 supplies power to the load over a first time $T_1$ as shown in FIGS. 4 and 5. When battery 62 has its voltage drop to level $V_{min}$, voltage sensing means 96 is activated to cause electrolyte to be dispensed to battery unit 64 as discussed above. Since battery 62 is still in the circuit in parallel with battery 64, and since diode 72 prevents battery 64 from charging battery 62, battery 64 will supply the power to the load, dropping the power requirements of battery 62 as shown in FIG. 5. Since the current $I_{62}$ is being supplied to the load, the power delivered by battery 64 is less and, accordingly, the life of battery 64 would be greater than the life of battery 62. Similarly, when battery 66 is activated at time $T_2$, the life of this battery will be extended by reason of the fact batteries 62 and 64 will be adding whatever power is left in said batteries to supply the load and relieve the requirements of the newly activated battery 66.

Figure 3:
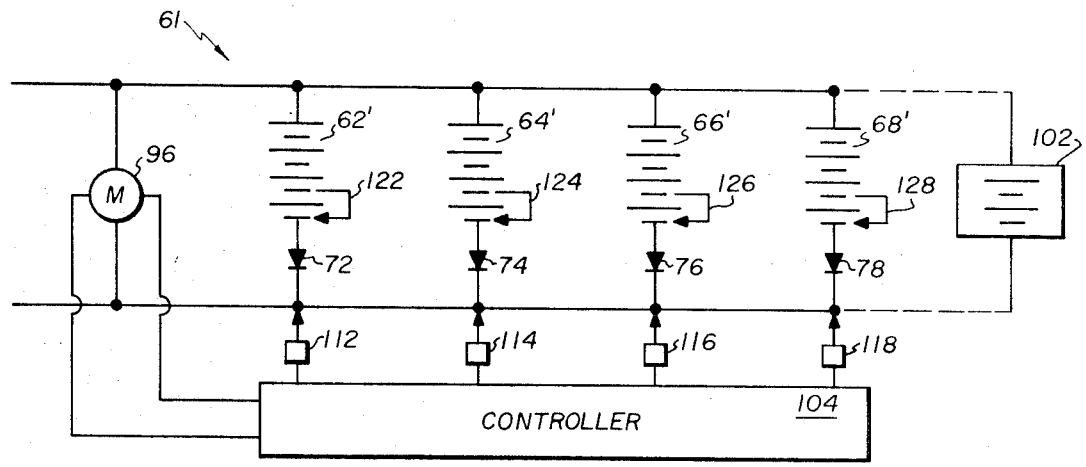
FIG. 3 is a schematic circuit diagram of the voltage controller and battery banks of another system showing optionally the connection of said system to a rechargable power source.
Figure 6:
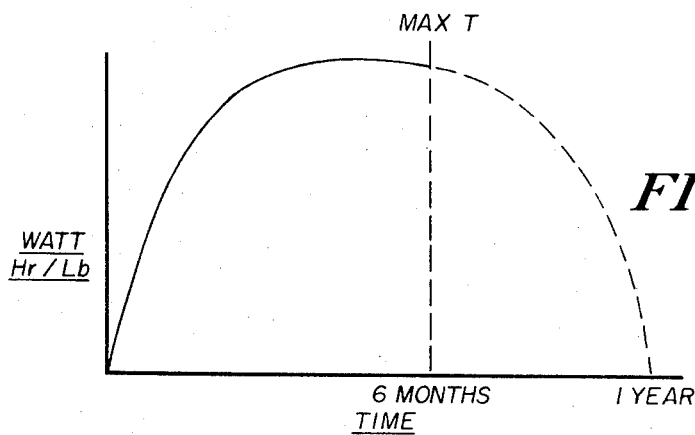
FIG. 6 is a plot of watt hours per pound against time in months delivered by a silver oxide/zinc battery of the type shown in FIG. 3 under continous load conditions.

FIG. 3 shows a system 61 including a voltage sensor 96 also connected across a circuit to be protected, a rechargeable silver oxide/zinc battery 102, a controller 104, and a series of activating means 112, 114, 116, and 118 which cause the requisite electrolyte to be dispensed into cells 62', 64', 66', and 68' respectively. In order to prevent the back flow of electrical energy, diodes 72, 74, 76, and 78 are placed in series with cells 62', 64', 66', and 68' respectively. The battery 102 has approximately a six month life as shown in FIG. 6. Upon failure of the power source 102 the loss of voltage across the load circuit will be sensed by voltage sensor 96 which in turn will cause control means 104 to operate the first activator means 112 thus energizing reserve bank 62'. Reserve bank 62' will be operative to quickly charge battery 102 as well as maintain power in the load circuit.

Since the supply of current will enter the load circuit rapidly, the change in potential will be sensed by voltage sensor 96 which in turn will prevent controller 104 from proceeding to activate the next bank of batteries in sequence. The controller 104 also is operative as a voltage regulator for the load circuit voltage. In the event however, that the first bank 62' is faulty and does not activate properly, bank 64' will then be energized.

The power in the load circuit is supplied by a long life rechargeable battery source, in the form of the silver oxide/zinc battery 102 of FIG. 3. Thus when the voltage supplied across the load circuit by battery 102 falls below a desired minimum, the first bank of reserve batteries 62' will be activated. Since the batteries preferably chosen for the reserve banks are capable of delivering a high load in a relatively short time, upon activation battery 62' will recharge battery 102 which continues to supply current to the load circuit in parallel with battery 102. Upon the second discharge of battery 102 reserve bank 64' will be activated, and so on.

A voltage step-up converter is provided in the controller 104 so that low voltage reserve batteries can be used, as low voltage reserve batteries are more efficient than their higher voltage counterparts. Each of the batteries 62', 64', 66', and 68' have bypass taps 128, 122, 124 and 126 which bypass one cell or set of cells in their respective batteries. When normally operating each battery such as 62' with the bypass tap 120 as shown provides sufficient voltage in the manner shown in FIG. 4. However, when the battery voltage reaches the level $V_{min}$, controller 104 is operative to dispense electrolyte into the additional cell or sets of cells associated with the bypass tap, and to further open the bypass tap. This will add just enough energy to bring the voltage up to its initial voltage.

It is to be understood that just as a large variety of cells may be utilized requiring the dispensing of different electrolytes, the electrolytes themselves may be dispensed into the cells by a variety of means. The simplest of these injection means is the opening of a closure between the reservoir and the cell and permitting the electrolyte to flow into the cell by gravity. The closure may, for example, be a faucet which is opened or a membrane which is ruptured. In the case of the use of the system in a buoy where sea water may be the activating electrolyte, devices may be utilized which will dispense or cause to pass into the cells of the reserve battery bank a substantially predetermined amount of sea water.

Alternatively, circumstances can be foreseen where gravity feed would not be feasible for the injection of electrolyte. The most important of such uses would be where the system is installed in a space craft. Under these circumstances the liquid electrolyte must be projected into cell. This projection may be caused by the mechanical release of a plunger such as a spring biased syringe plunger. Alternatively, the expelling force may be provided by gas pressure upon one side of an expandable membrane contacting the electrolyte on the other side thereof. The gas which causes the membrane to expand may be supplied from an external source or be generated from a gas pellet by means well known to the art.

It is to be understood however, that the system of the present invention is by no means to be considered as limited by any specific means of causing the electrolyte to be dispensed into the cells of the inactive reserve batteries, or by specific method of operation or construction of the controller which causes the dispensing of the electrolyte into the cells of the inactive battery.

Although this invention has been described with respect to its preferred embodiments, it should be understood that many variations and modifications will now be obvious to those skilled in the art, and it is preferred, therefore, that the scope of the invention be limited not by the specific disclosure herein, only by the appended claims.

I claim as my invention:

1. A reserve power system for supplying a voltage across a load, said voltage having a nominal value, said system comprising:
   a first initially inactive battery source, adapted to receive electrolyte through a first inlet, for providing said voltage to said load in response to the addition of electrolyte through said first inlet;
   a first reservoir for storing electrolyte;
   first means responsive to a first control signal for dispensing electrolyte from said reservoir into said first initially inactive battery power source through said first inlet; and
   voltage sensing means responsive to said voltage across said load differing from said nominal value by a predetermined amount for providing said first control signal.

2. A system according to claim 1 wherein said battery power source comprises a plurality of cells connected in series.

3. The system as defined in claim 1 also including:
   a second initially inactive battery power source adapted to receive electrolyte through a second inlet for activating said second battery power source; and
   means for connecting said second initially inactive battery power source in parallel with said load.

4. The system as defined in claim 3 in which said voltage sensing means provides said first control signal in response to a first occurrence of said voltage across said load differing from said nominal value by said predetermined amount, said voltage sensing means also providing a second control signal in response to a further occurrence of said voltage across said load differing from said nominal value by said predetermined amount, said system also including:
   a second reservoir for storing electrolyte; and
   a second means responsive to said second control signal for dispensing electrolyte from said second reservoir into said second initially inactive battery power source through said second inlet.

5. The system as defined in claim 4 also including first and second unit directional conducting devices connected in series between said first and second initially inactive battery power sources respectively and said load.

6. The system as defined in claim 1 in which said voltage sensing means provides said first control signal in response to a first occurrence of said voltage across said load differing from said nominal value by said predetermined amount, said voltage sensing means also providing a second control signal in response to a further occurrence of said voltage across said load differing from said nominal value by said predetermined amount, said system also including:
   a first initially inactive battery cell connected in series with said first initially inactive battery power source and said load, said first battery cell being adapted to receive electrolyte through a second inlet for activating said first cell;
   means for normally shorting said first initially inactive battery cell, said shorting means being responsive to said second control signal to remove said short;
   a second reservoir for storing electrolyte; and
   a second means responsive to said escond control signal for dispensing electrolyte from said second reservoir into said first initially inactive battery cell through said second inlet.

7. The system according to claim 6 in which said voltage sensing unit provides a third control signal in response to a further occurrene of said voltage across said load differing from said nominal value by said predetermined amount after the occurrence of said second control signal, said system also including:
   a second initially inactive battery power source adapted to receive electrolyte through a third inlet for providing said voltage to said load in response to the addition of electrolyte through said third inlet;

a third reservoir for storing electrolyte; and third means responsive to said third control signal for dispensing electrolyte from said third reservoir into said second battery power source through said third inlet.

8. The system as defined in claim 1 also including a rechargeable battery source connected in parallel with said load.

9. The system as defined in claim 3 wherein a unit directional current conducting device is placed in series with each of said battery power sources.

10. The system as defined in claim 1 wherein said dispensing means is operated by gravity to dispense electrolyte into said first initially inactive battery power source.

References Cited
UNITED STATES PATENTS 3,394,034    7/1968    Maes _____ 136—162

DONALD L. WALTON, Primary Examiner